(12) United States Patent
Mac et al.

(10) Patent No.: US 11,521,044 B2
(45) Date of Patent: Dec. 6, 2022

(54) ACTION DETECTION BY EXPLOITING MOTION IN RECEPTIVE FIELDS

(71) Applicants: International Business Machines Corporation, Armonk, NY (US); The Board of Trustees of the University of Illinois, Urbana, IL (US)

(72) Inventors: Khoi-Nguyen C. Mac, Urbana, IL (US); Raymond Alexander Yeh, Urbana, IL (US); Dhiraj Joshi, Ossining, NY (US); Minh N. Do, Champaign, IL (US); Rogerio Feris, Hartford, CT (US); Jinjun Xiong, Goldens Bridge, NY (US)

(73) Assignees: INTERNATIONAL BUSINESS MACHINES CORPORATION, Armonk, NY (US); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 1239 days.

(21) Appl. No.: 15/982,181

(22) Filed: May 17, 2018

(65) Prior Publication Data

US 2019/0354835 A1    Nov. 21, 2019

(51) Int. Cl.
*G06N 3/04* (2006.01)
*G06N 3/08* (2006.01)
*G06V 40/20* (2022.01)

(52) U.S. Cl.
CPC ............... *G06N 3/049* (2013.01); *G06N 3/08* (2013.01); *G06V 40/20* (2022.01)

(58) Field of Classification Search
CPC ........... G06K 9/00335; G06K 9/00744; G06N 20/10; G06N 3/0445; G06N 3/0454;
(Continued)

(56) References Cited

U.S. PATENT DOCUMENTS

2017/0220854 A1* 8/2017 Yang ..................... G06K 9/522
2019/0042851 A1* 2/2019 Varadarajan ....... G06K 9/00771
(Continued)

FOREIGN PATENT DOCUMENTS

CN    107292319 A    10/2017
WO    2017150032 A1    8/2017

OTHER PUBLICATIONS

Bertasius et al., "Object Detection in Video with Spatiotemporal Sampling Networks", Mar. 15, 2018, arXiv:1803.05549v1, pp. 1-16 (Year: 2018).*

(Continued)

*Primary Examiner* — Brent Johnston Hoover
(74) *Attorney, Agent, or Firm* — Amin, Turocy & Watson, LLP

(57) ABSTRACT

Techniques regarding action detection based on motion in receptive fields of a neural network model are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a motion component that can extract a motion vector from a plurality of adaptive receptive fields in a deformable convolution layer of a neural network model. The computer executable components can also comprise an action detection component that can generate a spatio-temporal feature by concatenating the motion vector with a spatial feature extracted from the deformable convolution layer.

20 Claims, 10 Drawing Sheets

600

```
EXTRACTING, BY A SYSTEM OPERATIVELY COUPLED TO A
PROCESSOR, A MOTION VECTOR FROM A PLURALITY OF          — 602
ADAPTIVE RECEPTIVE FIELDS IN A DEFORMABLE
CONVOLUTION LAYER OF A NEURAL NETWORK MODEL
```

```
GENERATING, BY THE SYSTEM, A SPATIO-TEMPORAL FEATURE
BY CONCATENATING THE MOTION VECTOR WITH A SPATIAL      — 604
FEATURE EXTRACTED FROM THE DEFORMABLE CONVOLUTION
LAYER
```

(58) Field of Classification Search
CPC .... G06N 3/0472; G06N 3/0481; G06N 3/049; G06N 3/08; G06N 7/005
See application file for complete search history.

(56) References Cited

U.S. PATENT DOCUMENTS

| | | | |
|---|---|---|---|
| 2019/0291723 A1* | 9/2019 | Srivatsa | G06T 19/006 |
| 2020/0057936 A1* | 2/2020 | Haeusser | G06K 9/6256 |
| 2020/0410352 A1* | 12/2020 | Buckler | H03M 7/46 |

OTHER PUBLICATIONS

Kang, et al., Review of action recognition and detection methods, Nov. 1, 2016, 126 Pages.

Singh, et al., A Multi-Stream Bi-Directional Recurrent Neural Network for Fine-Grained Action Detection, Computer Vision and Pattern Recognition, 2016, 10 Pages.

Rohrbach, et al., A Database for Fine Grained Activity Detection of Cooking Activities, IEEE Conf. on Computer Vision and Pattern Recognition, Jun. 2012, 8 Pages.

Simonyan, et al., Two-Stream Convolutional Networks for Action Recognition in Videos, 2014, 9 Pages.

Feichtenhofer, et al., Convolutional Two-Stream Network Fusion for Video Action Recognition, Conference on Computer Vision and Pattern Recognition, 2016, 9 Pages.

Feichtenhofer, et al., Spatiotemporal Residual Networks for Video Action Recognition, 30th Conference on Neural Infomnation Processing Systems, 2016, 9 Pages.

Lea, et al., Segmental Spatiotemporal CNNs for Fine-grained Action Segmentation, European Conference on Computer Vision, Sep. 30, 2016, 17 Pages.

Lea, et al., Temporal Convolutional Networks for Action Segmentation and Detection, Nov. 16, 2016, 10 Pages.

Dai, et al., Deformable Convolutional Networks, 2017, 10 Pages.

Stein, et al., Combining Embedded Accelerometers with Computer Vision for Recognizing Food Preparation Activities, Proceedings of the 2013 ACM International Joint Conference on Pervasive and Ubiquitous Computing, Sep. 2013, 10 Pages.

Diba et al., Temporal 3D ConvNets: New Architecture and Transfer Learning for Video Classification, Nov. 22, 2017, 9 Pages.

Simonyan, et al., Very deep convolutional networks for large-scale image recognition, Apr. 10, 2015, 14 Pages.

Szegedy, et al., Going Deeper with Convolutions, Proceedings of the IEEE conference on computer vision and pattern recognition, 2015, 9 Pages.

He, et al., Deep Residual Learning for Image Recognition, Proceedings of the IEEE conference on computer vision and pattern recognition, 2016, 9 Pages.

Holschneider, et al., A Real-Time Algorithm for Signal Analysis with the Help of the Wavelet Transform, Wavelets, 1990, pp. 286-297.

Yu, et al., Multi-scale context aggregation by dilated convolutions, International Conference on Learning Representations (ICLR), 2016, 13 Pages.

Yu, et al., Dilated Residual Networks, Computer Vision and Pattern Recognition (CVPR), 2017, 9 Pages.

Qian, et al., On the momentum term in gradient descent learning algorithms, Neural Networks, 1999, 14 Pages.

Abadi, et al., TensorFlow: Large-scale machine learning on heterogeneous systems, Nov. 9, 2015, 19 Pages.

Jaderberg, et al., Spatial Transformer Networks, NIPS, 2015, 9 Pages.

Wang, et al., Action Recognition by Dense Trajectories, IEEE Conference on Computer Vision & Pattern Recognition, Jun. 2011, pp. 3169-3176.

Mel, et al., The NIST Definition of Cloud Computing, National Institute of Standards and Technology Special Publication 800-145, Sep. 2011, 7 Pages.

* cited by examiner

ACTION DETECTION BY EXPLOITING MOTION IN RECEPTIVE FIELDS

BACKGROUND

The subject disclosure relates to action detection via neural network models, and more specifically, to autonomous fine-grained action detection by exploiting motion in receptive fields of a neural network model.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can autonomously detect fine-grain action based on motion in one or more receptive fields of one or more neural networks are described herein.

According to an embodiment, a system is provided. The system can comprise a memory that can store computer executable components. The system can also comprise a processor, operably coupled to the memory, and that can execute the computer executable components stored in the memory. The computer executable components can comprise a motion component that can extract a motion vector from a plurality of adaptive receptive fields in a deformable convolution layer of a neural network model. The computer executable components can also comprise an action detection component that can generate a spatio-temporal feature by concatenating the motion vector with a spatial feature extracted from the deformable convolution layer.

According to an embodiment, a computer-implemented method is provided. The computer-implemented method can comprise extracting, by a system operatively coupled to a processor, a motion vector from a plurality of adaptive receptive fields in a deformable convolution layer of a neural network model. The computer-implemented method can also comprise generating, by the system, a spatio-temporal feature by concatenating the motion vector with a spatial feature extracted from the deformable convolution layer.

According to an embodiment, a computer program product that can facilitate fine-grained action based on motion in receptive fields is provided. The computer program product can comprise a computer readable storage medium having program instructions embodied therewith. The program instructions can be executable by a processor to cause the processor to extract, by a system operatively coupled to the processor, a motion vector from a plurality of adaptive receptive fields in a deformable convolution layer of a neural network model. The program instructions can further cause the processor to generate, by the system, a spatio-temporal feature by concatenating the motion vector with a spatial feature extracted from the deformable convolution layer.

DETAILED DESCRIPTION

Figure 1:
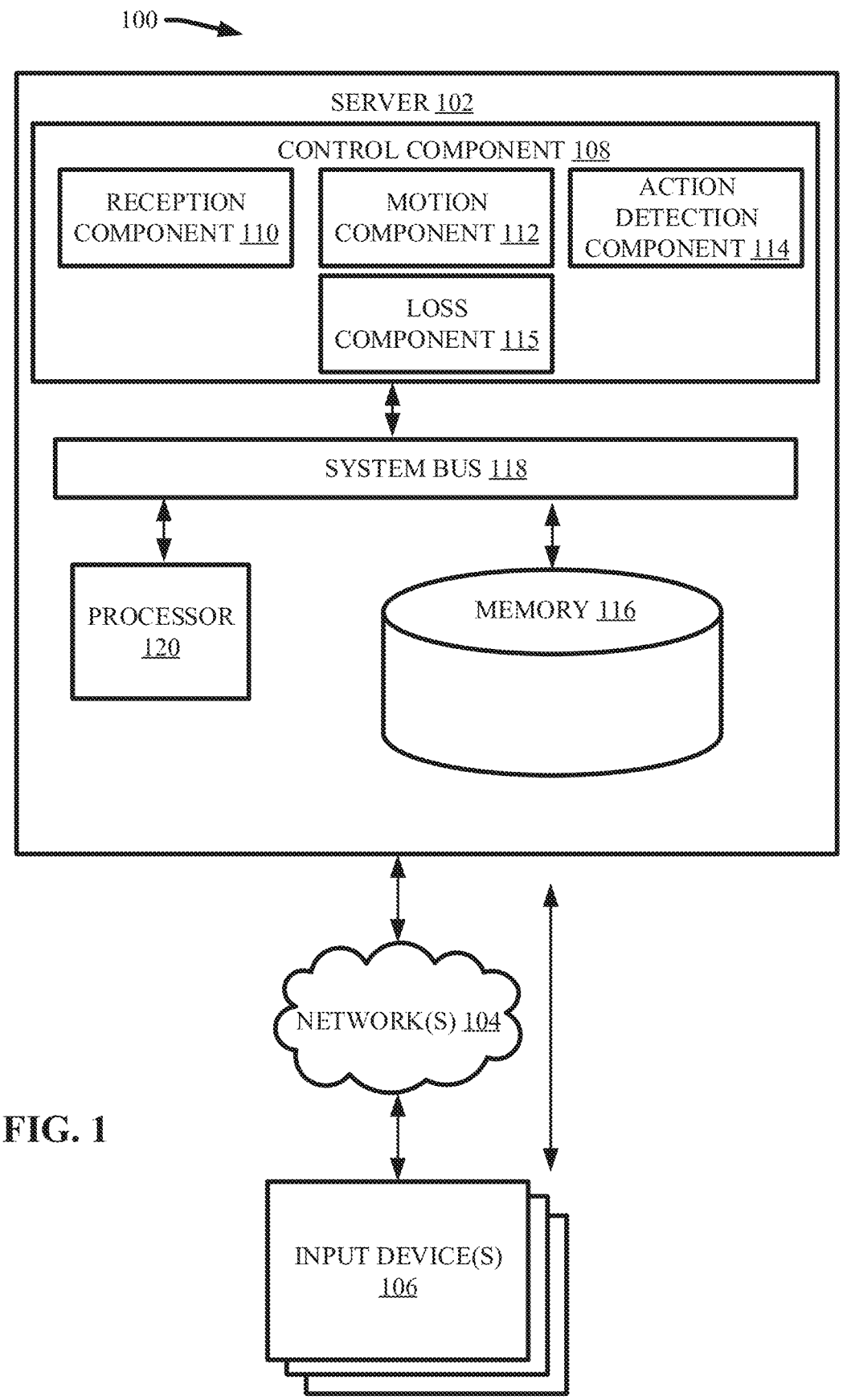
FIG. 1 illustrates a block diagram of an example, non-limiting system that can facilitate action (e.g., fine-grained action) detection based on motion in one or more receptive fields of a neural network model in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Artificial intelligence ("AI") technologies can be utilized to perform various machine learning tasks using one or more neural network models. One such machine learning task can include action detection, which can regard classifying every frame of a given video as one out of "N" defined categories (e.g., including a category for unknown actions). For example, action detection can regard the detection of fine-grained actions, wherein one or more neural network models can facilitate determining: which objects are moving from frame to frame in the video; and how said objects are moving from frame to frame. Traditional approaches to fine-grained action detection decouple spatial and temporal information in different feature extractors and then combine the two respective streams of features with a fusion model.

Various embodiments of the present invention can be directed to computer processing systems, computer-implemented methods, apparatus and/or computer program products that facilitate the efficient, effective, and autonomous (e.g., without direct human guidance) detection of actions (e.g., fine-grained actions) based on motion in one or more receptive fields of one or more neural network models. For example, one or more embodiments be directed to computer processing systems, computer-implemented methods, apparatus and/or computer program products that can regard learning temporal information (e.g., regarding how one or more objects move from frame to frame in a video) in the feature space of a neural network model by utilizing one or more deformable convolutional layers of the neural network model. For instance, one or more embodiments can regard detecting motion by evaluating a change in adaptive receptive fields over time. Thus, various embodiments can jointly model and/or determine objects and their motion fields at multiple scales without requiring additional processing of optical flow.

The computer processing systems, computer-implemented methods, apparatus and/or computer program products employ hardware and/or software to solve problems that are highly technical in nature (e.g., fine-grained action detection based on motion extracted from receptive fields in a deformable convolution layer of a neural network model), that are not abstract and cannot be performed as a set of mental acts by a human. For example, an individual, or even a plurality of individuals, cannot readily and efficiently analyze video data frame-by-frame to detect and/or quantify motion exhibited by one or more objects. In particular, an individual is incapable of detecting subtly and/or discrete motion with the level of accuracy and/or efficiency demonstrated by the various embodiments described herein. Additionally, one or more embodiments described herein can utilize AI technologies that are autonomous in their nature to facilitate determinations and/or predictions that cannot be readily performed by a human.

As used herein, the term "machine learning task" can refer to an application of AI technologies to automatically and/or autonomously learn and/or improve from an experience (e.g., training data) without explicit programming of the lesson learned and/or improved. For example, machine learning tasks can utilize one or more algorithms to facilitate supervised and/or unsupervised learning to perform tasks such as classification, regression, and/or clustering.

As used herein, the term "neural network model" can refer to a computer model that can be used to facilitate one or more machine learning tasks, wherein the computer model can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). Neural network models can learn through training, wherein data with known outcomes is inputted into the computer model, outputs regarding the data are compared to the known outcomes, and/or the weights of the computer model are autonomous adjusted based on the comparison to replicate the known outcomes. As used herein, the term "training data" can refer to data and/or data sets used to train one or more neural network models. As a neural network model trains (e.g., utilizes more training data), the computer model can become increasingly accurate; thus, trained neural network models can accurately analyze data with unknown outcomes, based on lessons learning from training data, to facilitate one or more machine learning tasks. Example neural network models can include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), convolutional neural network ("CNN"), temporal convolutional network ("TCN"), deconvolutional network ("DN"), deep convolutional inverse graphics network ("DCIGN"), generative adversarial network ("GAN"), liquid state machining ("LSM"), extreme learning machine ("ELM"), echo state network ("ESN"), deep residual network ("DRN"), kohonen network ("KN"), support vector machine ("SVM"), and/or neural turing machine ("NTM").

As used herein, the term "fine-grained action" can refer to an action having a high inter-class similarity. For example, it can be difficult for even humans to distinguish two different fine-grained actions just from observing single frames of given video data. Fine-grained actions can regard an object moving from frame to frame in video data and/or how the object moves from frame to frame in the video data. For fine-grained actions: the detected motion is slow from a first frame (e.g., "t−1") to a second frame (e.g., "t"); the detected motion from the first frame to the second frame can have a constant velocity; the same activation unit "n" from two frames can correspond to similar receptive fields on the frames; and/or the detected motion can be minimal in one or more background regions.

FIG. 1 illustrates a block diagram of an example, non-limiting system 100 that can facilitate detection of one or more actions (e.g., fine-grained actions) based on motion in one or more receptive fields of one or more neural network models (e.g., vision-based neural network models) in accordance with one or more embodiments described herein. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more input devices 106. The server 102 can comprise control component 108. The control component 108 can further comprise reception component 110, motion component 112, action detection component 114, and/or loss component 115. Also, the server 102 can comprise or otherwise be associated with at least one memory 116. The server 102 can further comprise a system bus 118 that can couple to various components such as, but not limited to, the control component 108 and associated components, memory 116 and/or a processor 120. While a server 102 is illustrated in FIG. 1, in other embodiments, multiple devices of various types can be associated with or comprise the features shown in FIG. 1. Further, the server 102 can communicate with a cloud computing environment via the one or more networks 104.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the control component 108 can be provided on the one or more servers 102, it should be appreciated that the architecture of system 100 is not so limited. For example, the control component 108, or one or more components of control component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the server 102. For example, the one or more input devices 106 can send data to the reception component 110 (e.g., via a direct connection and/or via the one or more networks 104). For instance, inputted data can comprise video data, one or more images, a combination thereof, and/or the like. Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

The control component 108 can facilitate action detection (e.g., fine-grained action detection) based on, for example, one or more adaptive receptive fields in one or more deformable convolution layers of one or more neural network models (e.g., one or more CNN such as ResNet). The one or more adaptive receptive fields in the one or more deformable convolution layers can be an aggregation of important pixels of video data, as the subject neural network model (e.g., ResNet CNN) can have the flexibility to change where each convolution samples from. Thus, key-points can be consistent within the video data across various frames and the control component 108 can capture motion by determining one or more differences in the one or more adaptive receptive fields across time. As deformable convolution layers can be trained end-to-end, the control component 108 can learn to model motion (e.g., via one or more motion vectors) at one or more hidden layers of the one or more neural networks (e.g., which can create one or more multiscale motion vectors). Further, the control component 108 can combine the learned motion (e.g., one or more motion vectors) with one or more spatial features to generate one or more spatiotemporal features, which can thereby characterize one or more fine-grained actions associated with the one or more spatial features.

The reception component 110 can receive the data entered by a user of the system 100 via the one or more input devices 106. The reception component 110 can be operatively coupled to the one or more input devices 106 directly (e.g., via an electrical connection) or indirectly (e.g., via the one or more networks 104). Additionally, the reception component 110 can be operatively coupled to one or more components of the server 102 (e.g., one or more component associated with the control component 108, system bus 118, processor 120, and/or memory 116) directly (e.g., via an electrical connection) or indirectly (e.g., via the one or more networks 104). For example, in one or more embodiments, the one or more target data sets received by the reception component 110 can be communicated to the motion component 112 (e.g., directly or indirectly) and/or can be stored in the memory 116 (e.g., located on the server 102 and/or within a cloud computing environment).

The motion component 112 can feed the received data to one or more neural network models, which can be stored in the memory 116 (e.g., located on the server 102 and/or in a cloud computing environment accessible via the one or more networks 104), to extract one or more motion vectors from a plurality of adaptive receptive fields in one or more deformable convolution layers of the one or more neural network models. The one or more deformable convolution operation can be characterized, for example, by Equation 1 below:

$$y_l^{(t)}[p_0] = \Sigma_{p_n \in R} W_l[p_n] \cdot x_l^{(t)}[p_0 - p_n + \Delta p_{l,n,0}^{(t)}] \quad (1)$$

With regards to Equation 1, "$x_l^{(t)}$" can represent an input feature map of layer "l" and "$y_l^{(t)}$" can be its convolution response at frame "t." Further, "$p_n$" can represent sums over the regular pixel grid of "R", and "$\Delta p_{l,n,0}^{(t)}$" can be present an offset at each n, 0 location and an output of a submodular neural network model that can model the offset of each deformable convolution. Moreover, "$W_l$" can represent weights of the deformable convolution.

The motion component 112 can extract one or more motion vectors from the plurality of adaptive receptive fields based on Equation 1 above and Equations 2-4 presented below. For example, adaptive receptive fields at frame "t" and activation location "$p_0$" can be denoted as the vector "$F_{l,0}^{(t)}$" in Equation 2. Wherein T can represent transpose operation.

$$F_{l,0}^{(t)} = [p_0 - p_n + \Delta p_{l,n,0}^{(t)}]^T, \forall p_n \in R \quad (2)$$

Further, in Equation 3, the one or more motion vectors can be generalized for all activation locations as "$\mathcal{F}_l^{(t)}$".

$$\mathcal{F}_l^{(t)} = [F_{l,0}^{(t)}, F_{l,1}^{(t)} \ldots]^T \quad (3)$$

The motion component 112 can extract one or more motion vectors from a plurality of adaptive receptive fields by computing a difference of the receptive fields through time, which, for example, can be denoted via Equation 4 below.

$$r_l^{(t)} = \mathcal{F}_l^{(t)} - \mathcal{F}_l^{(t)} \quad (4)$$

With regards to Equation 4, the concatenation of "$r_l^{(t)}$" across all favorable convolution layers can be denoted as "$r^{(t)}$", which can refer to the one or more extracted (e.g., learned) motion vectors.

The action detection component 114 can extract one or more spatial features from the one or more deformable convolution layers, "$y_L^{(t)}$," where "L" can be the index of the final layer. In one or more embodiments, the action detection component 114 can utilize a two layered fully connected neural network model to aggregate the one or more motion vectors (e.g., temporal information) and/or the one or more spatial features (e.g., spatio information) to generate one or more spatio-temporal features (e.g., classification predictions). In one or more other embodiments, the action detection component 114 can utilize a more complicated neural network model (e.g., TCN), as compared to a two layered fully connected neural network model, to aggregate and/or concatenate the one or more motion vectors and/or the one or more spatial features. For example, the action detection component 114 can utilize two 3D convolutions followed by two fully connected layers, wherein each 3D convolution unit can be followed by batch normalization, rectified linear unit ("ReLU") activation, and/or 3D max pooling to gradually reduce temporal dimension while the spatial dimension can be retained.

To train the one or more subject neural networks, the loss component 115 can compute class loss "C" and/or motion loss "M." Class loss can be cross-entropy loss that can enforce a correctness of a predicted classification and/or label. Motion loss can be regularization that can enforce a consistency of learned motion (e.g., extracted motion vectors) across time. A total loss "$\mathcal{L}$" can be defined by the loss component 115 in accordance with Equation 5 below.

$$\mathcal{L} = \frac{1}{2}\lambda \|\Theta\|_2^2 + \Sigma_i^{|D|}(C^{(i)} + M^{(i)}) \quad (5)$$

Wherein "D" can represent the subject dataset (e.g., input data received by the reception component 110 and/or inputted into the system 100 by the one or more input devices 106 and/or the one or more networks 104), such that D = $\{v^{(i)}, z^{(i)}\}$, where $v^{(i)} \in \mathbb{R}^{H \times W \times L}$ can be a video snippet with a corresponding frame-label of $z^{(i)} \in \{1, 2, \ldots, K\}$. Also, wherein "$\frac{1}{2}\lambda\|\Theta\|_2^2$" can represent a weight decay regularization on the model parameters "$\Theta$." Wherein '$\mathbb{R}$' can represent a set of real numbers, "H" can represent a height dimension of a video, "W" can represent a width dimension of a video, and/or "(i)" can represent a sample index.

The loss component 115 can compute class loss "$C^{(i)}$" as the classification loss on the video snippet in accordance with Equation 6 below.

$$C^{(i)} = \Sigma_k - \log(\hat{z}^{(i)})^{1[z^{(i)} = k]} \quad (6)$$

Wherein "$\hat{z}^{(i)}$" can be the predicted class labels for the video snippet "$v^{(i)}$", and 1 can be the indicator function. Also, "k" can represent an example class label.

The loss component 115 can further compute motion loss "$M^{(i)}$" in accordance with Equation 7 below.

$$M^{(i)} = \Sigma_i \Sigma_l \|r_l^{(t)}\|_2^2 \quad (7)$$

Wherein "l" can be the index over the number of deformable convolutions. The motion loss can encourage an offset to be consistent over time.

When movement between frames of the video data is inconsistent, the motion loss can be high. When motion loss is low and there is actual motion between frames, the class loss can be high because the receptive fields do not evolve to adapt to the object in later frames. Therefore, the control component 108 minimizes both the motion loss and the class loss to ensure that the motion is smooth and the receptive fields can approximate the relevant key points.

Wherein traditional methods typically utilize optical flow to approximate motion (e.g., by computing motion vectors among neighboring pixels with similar values), the control component 108 (e.g., via the motion component 112, the action detection component 114, and/or the loss component 115) can inspect a plurality of adaptive receptive fields of the same activation location "$p_0$" over time. Thus, contrary to traditional methodologies, which can analyze at a pixel level, the control component 108 can detect fine-grained actions at a feature level. Since the control component 108 can analyze data (e.g., video data) at a feature level, commonly observed issues such as noise at pixel level can be avoided. Further, the detected motion, as modeled by the one or more neural networks described herein, can be trainable in an end-to-end fashion.

Additionally, one of ordinary skill in the art will recognize that the temporal component "$r_l^{(t)}$" can be the difference of learned offsets "$\Delta p_{l,n,0}^{(t)}$" since "$p_0 - p_n$" can be canceled as an object moves from "t−1" to "t." For standard convolutions, "$\Delta p_{l,n,0}^{(t)}$" can equal 0; thereby there is no temporal information introduced. For dilated convolutions, "$\Delta p_{l,n,0}^{(t)}$" can equal "$\Delta p_{l,n,0}^{(t-1)}$" since the dilated parameters can be fixed; thus, the difference of the offsets can also not carry any motion. In contrast, the offsets of deformable convolutions (e.g., as described herein) can be input-dependent; therefore, "$\Delta p_{l,n,0}^{(t)}$" does not equal "$\Delta p_{l,n,0}^{(t-1)}$" and the learned motion becomes meaningful. Further, by utilizing the adaptive receptive fields to detect motion, the one or more embodiments described herein can utilize a single stream neural network model; as opposed to the two stream models utilized in traditional approaches to action detection.

Figure 2A:
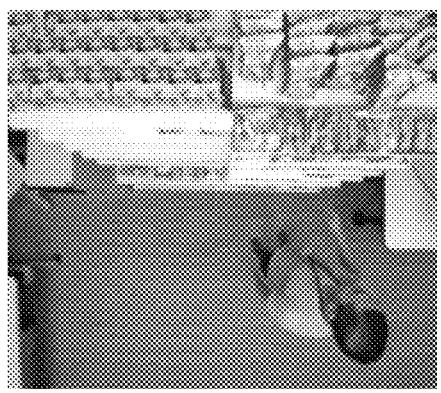
FIG. 2A illustrates a photo of an example, non-limiting first frame of video data that can be analyzed utilizing a system, which can facilitate action (e.g., fine-grained action) detection based on motion in one or more receptive fields of a neural network model in accordance with one or more embodiments described herein.
Figure 2B:
FIG. 2B illustrates a photo of an example, non-limiting second frame of video data that can be analyzed utilizing a system, which can facilitate action (e.g., fine-grained action) detection based on motion in one or more receptive fields of a neural network model in accordance with one or more embodiments described herein.
Figure 2C:
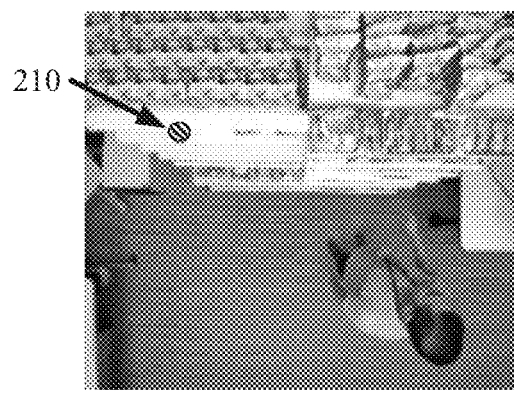
FIG. 2C illustrates a photo of an example, non-limiting first visualization of action (e.g., fine-grained action) detection that can be based on motion in one or more receptive fields of a neural network model in accordance with one or more embodiments described herein.
Figure 2D:
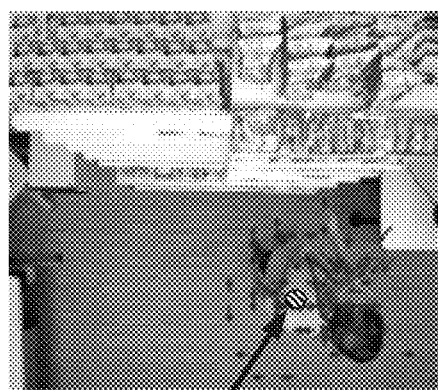
FIG. 2D illustrates a photo of an example, non-limiting second visualization of action (e.g., fine-grained action) detection that can be based on motion in one or more receptive fields of a neural network model in accordance with one or more embodiments described herein.
Figure 2E:
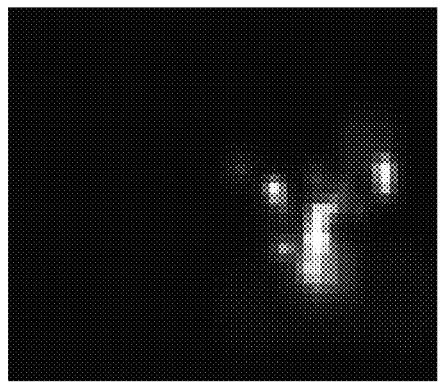
FIG. 2E illustrates a photo of an example, non-limiting third visualization of action (e.g., fine-grained action) detection that can be based on motion in one or more receptive fields of a neural network model in accordance with one or more embodiments described herein.

FIGS. 2A and 2B illustrate photos of example, non-limiting video frames that can be analyzed by the system 100 to facilitate action detection (e.g., fine-grained action detection) based on motion in a plurality of receptive fields in accordance with one or more embodiments described herein. FIGS. 2C-2E illustrate photos of example, non-limiting visualizations that can regard action detection (e.g., fine-grained action detection) by the system 100 based on motion in a plurality of receptive fields in accordance with one or more embodiments described herein. Repetitive description of like elements employed in other embodiments described herein is omitted for sake of brevity.

A first frame 200 (e.g., t−1), shown in FIG. 2A, and a second frame 202 (e.g., t), shown in FIG. 2B, can be consecutive video frames. The first visualization 204, shown in FIG. 2C, can depict extracted motion vectors (e.g., via the motion component 112) found in a background region with regards to the transition from the first frame 200 to the second frame 202. The second visualization 206, shown in FIG. 2D, can depict extracted motion vectors (e.g., via the motion component 112) found in a moving region with regards to the transition from the first frame 200 to the second frame 202. Additionally, the third visualization 208 shown in FIG. 2E can depict the motion field in feature space with regards to the transition from the first frame 200 to the second frame 202.

The motion depicted in FIGS. 2A-2E can be computed by the control component 108 using a difference in adaptive receptive fields on multiple feature spaces (e.g., in contrast to on pixel space, as performed by traditional techniques). The first frame 200 and/or the second frame 202 depict the action of an individual's reach to a shelf. The first frame 200 and/or the second frame 202 can be comprised within one or more datasets (e.g., video datasets) that can be inputted into the system 100 via the one or more input devices 106 (e.g., via the one or more networks) and/or stored in the memory 116 (e.g., located on the server 102 and/or a cloud computing environment accessible via the one or more networks 104).

The first visualization 204 and/or the second visualization 206 can depict extracted motion vectors corresponding to different regions of the subject frames. The cross-hatched circles can indicate activation units located in the respective regions. For example, the first visualization 204 can depict a first activation unit 210 in a background region; whereas the second visualization 206 can depict a second activation unit 212 in a foreground region. Further, the short arrows can depict one or more extracted motion vectors that can characterize motion around the corresponding activation units. Motion vectors with values below a predefined threshold can be suppressed for sake of visualization.

As shown in FIG. 2C, the lack of motion vectors can indicate that the first activation unit 210 is motionless in the background region as the difference between to adaptive receptive fields of the background region over time is minimal (e.g., below the defined threshold). In contrast, the presence of motion vectors shown in FIG. 2D can indicate that the second activation unit 212 comprises motion in the foreground region (e.g., an individual reaching for a shelve within the foreground region). The motion field at all activation units (e.g., first activation unit 210 and/or second activation unit 212) can be depicted in the third visualization 208, wherein the field's energy can correspond to a length of the motion vectors at each location. As shown in the third activation, the motion field is excited around the moving region (e.g., the foreground region), as indicated by the grey scaling, while suppressed in the motionless region (e.g., the background region), as indicated by the solid black coloring. In one or more embodiments, the control component 108 can analyze the exemplary first frame 200 and/or second frame 202 to generate the exemplary first visualization 204, second visualization 206, and/or third visualization 208 to facilitate action detection (e.g., fine-grained action detection).

Figure 3:
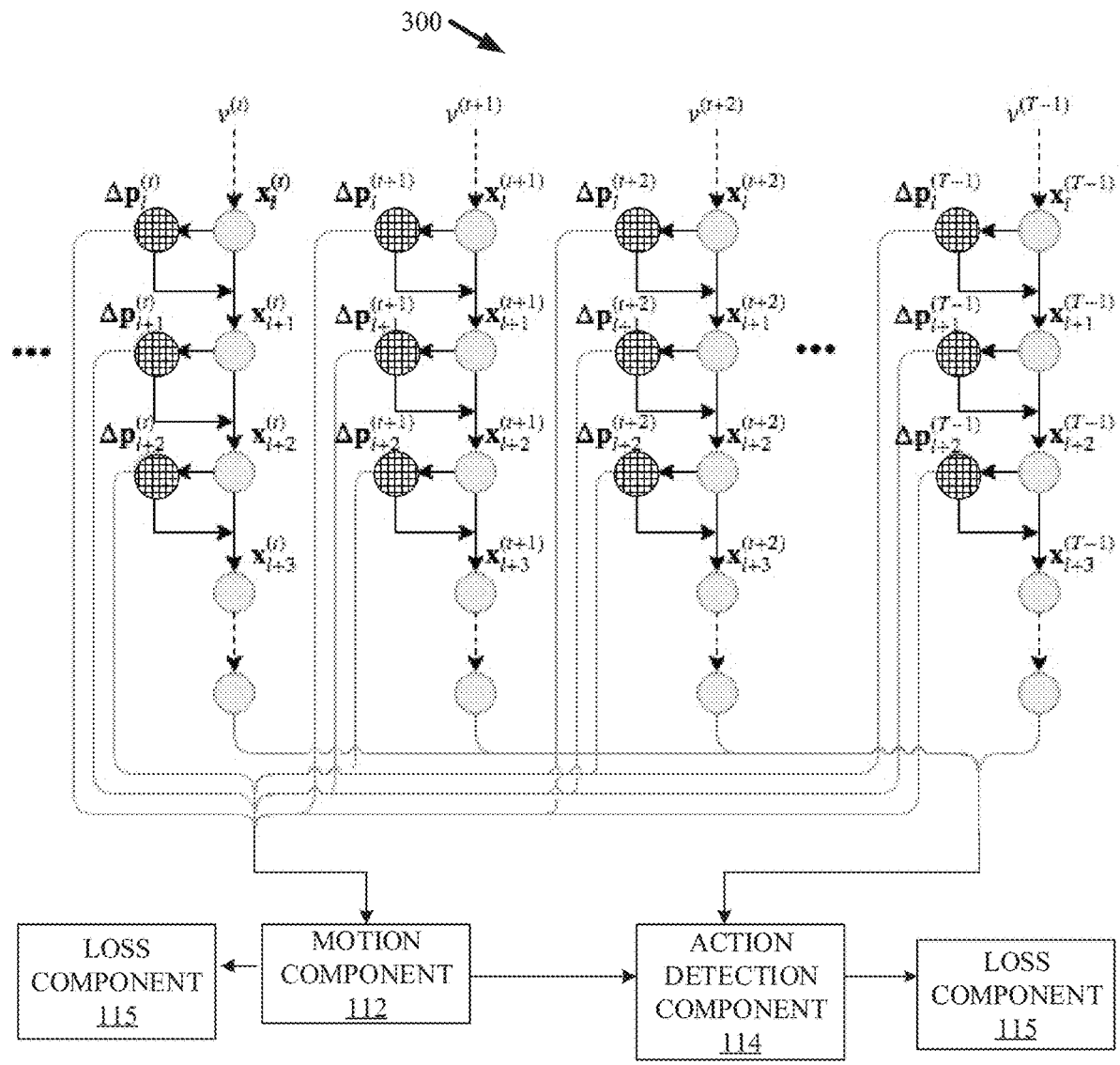
FIG. 3 illustrates a diagram of an example, non-limiting model architecture that can facilitate action (e.g., fine-grained action) detection, by a system, based on motion in one or more receptive fields of a neural network model in accordance with one or more embodiments described herein.

FIG. 3 illustrates a diagram of an example, non-limiting architecture 300 that can depict one or more extractions of one or more features (e.g., motion vectors), one or more processes, and/or one or more determinations that can be facilitated by the system 100 (e.g., the control component 108) to achieve action detection (e.g., fine-grained action detection) based on motion in adaptive receptive fields of a neural network model (e.g., a CNN) in accordance with one or more embodiments described herein. Repetitive description of like elements employed in other embodiments described herein is omitted for sake of brevity.

As shown in FIG. 3, the architecture 300 can depict analytics that can be performed by the control component 108 in accordance with one or more embodiments described herein. For example, the motion component 112 can extract one or more motion vectors as the difference of adaptive receptive fields (e.g., delineated by checkered hatching in FIG. 3) in a deformable convolution layer, wherein the output of a deformable convolution layer can be same as the input of the next deformable convolution layer. The motion component 112 can aggregate the plurality of motion vectors extracted across various time frames and/or share the extracted and/or computed motion vectors with the loss component 115 and/or the action detection component 114.

The action detection component 114 can extract one or more spatial features as the output of the one or more deformable convolution layers and/or can receive the one or more motion vectors from the motion component 112. The action detection component 114 can concatenate the learned motion vectors and/or spatial features to generate one or more spatio-temporal features that can characterize action detection (e.g., fine-grained action detection) associated with the spatial features. The loss component 115 can compute the motion loss based on the one or more motion vectors and/or the class loss based on the one or more spatial features. Further, the neural network model characterized by the architecture 300 can be trained end-to-end.

Figure 4:
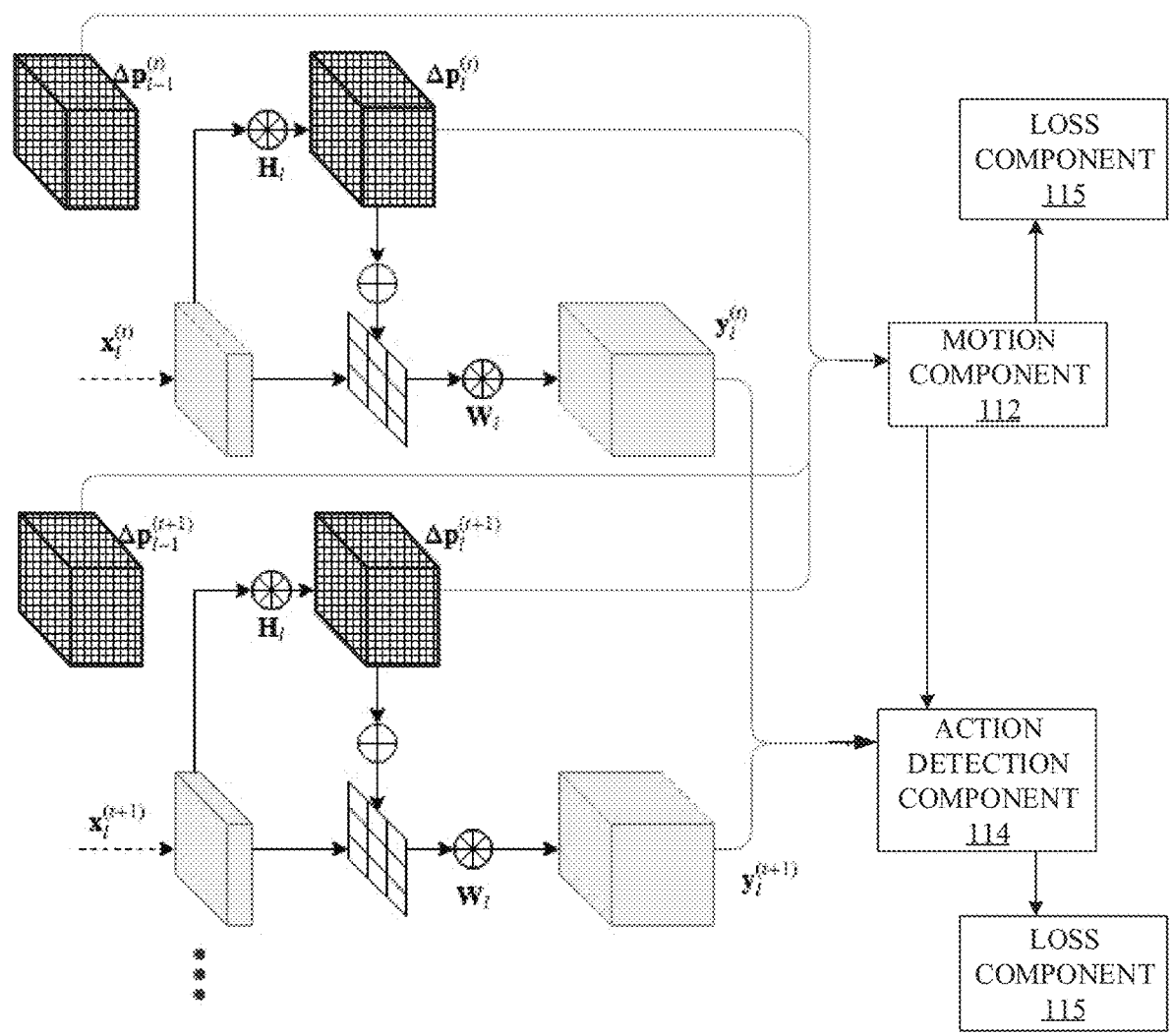
FIG. 4 illustrates a diagram of an example, non-limiting model architecture that can facilitate action (e.g., fine-grained action) detection, by a system, based on motion in one or more receptive fields of a neural network model in accordance with one or more embodiments described herein.

FIG. 4 illustrates another diagram of the example, non-limiting architecture 300 that can depict one or more extractions of one or more features (e.g., motion vectors), one or more processes, and/or one or more determinations that can be facilitated by the system 100 (e.g., the control component 108) to achieve action detection (e.g., fine-grained action detection) based on motion in adaptive receptive fields of a neural network model (e.g., a CNN) in accordance with one or more embodiments described herein. Repetitive description of like elements employed in other embodiments described herein is omitted for sake of brevity. FIG. 4 can depict a detailed segment of the architecture 300. For example, FIG. 4 illustrates how various motion vectors can be extracted (e.g., by the motion component 112) as the difference between adaptive receptive fields in a deformable convolution layer for respective video frames. Additionally, one or more spatial features can be extracted (e.g., by the action detection component 114) as outputs of one or more deformable convolution layers and/or concatenated (e.g., via the action detection component 114) with the one or more motion vectors.

Figure 5A:
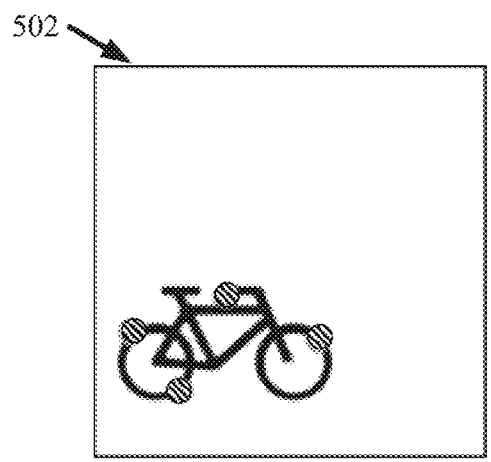
FIG. 5A illustrates a diagram of an example, non-limiting first frame of video data that can be analyzed utilizing a system, which can facilitate action (e.g., fine-grained action) detection based on motion in one or more receptive fields of a neural network model in accordance with one or more embodiments described herein.
Figure 5B:
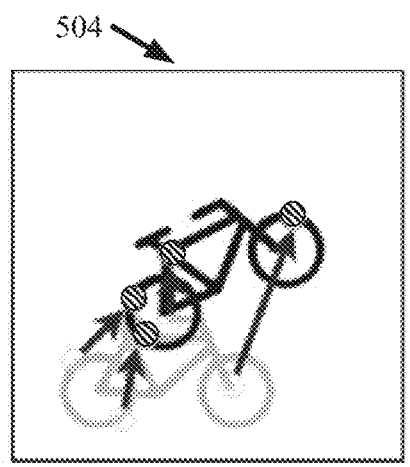
FIG. 5B illustrates a diagram of an example, non-limiting second frame of video data that can be analyzed for action detection using one or more traditional approaches.
Figure 5C:
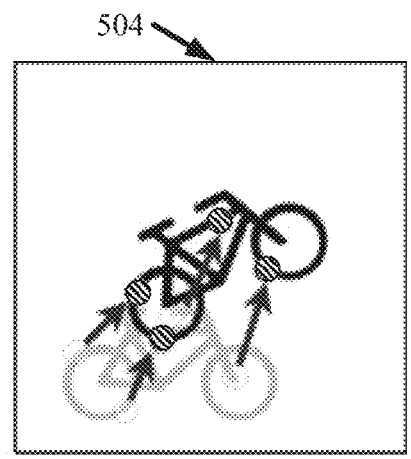
FIG. 5C illustrates a diagram of an example, non-limiting second frame of video data that can be analyzed utilizing a system, which can facilitate action (e.g., fine-grained action) detection based on motion in one or more receptive fields of a neural network model in accordance with one or more embodiments described herein.

FIG. 5A illustrates a diagram of an example, non-limiting first video frame 502 comprising a bicycle at a first time (t). FIGS. 5B and 5C illustrate diagrams of an example, non-limiting second video frame 504 comprising the bicycle at a second time (t+1). Repetitive description of like elements employed in other embodiments described herein is omitted for sake of brevity.

As described with regards to FIGS. 2C and 2D, FIGS. 5B and 5C depict activation units (e.g., depicted by cross-hatching) and/or motion vectors (e.g., depicted by arrows). FIG. 5B can depict action detection (e.g., fine-grained action detection) without motion consistency enforcing (e.g., without minimizing motion loss). In contrast, FIG. 5C can depict action detection (e.g., fine-grained action detection) with motion consistency enforcing (e.g., via minimization of motion loss) that can be achieved by exploiting motion in receptive fields of deformable convolution layers of a neural network mode (e.g., CNN). A comparison of the motion vectors depicted in FIG. 5B and the motion vectors of FIG. 5C illustrates that motion consistency enforcing can result in vectors with more uniform length and direction; thereby correlating to smoother approximation of motion than would otherwise be achieved (e.g., via traditional methods).

Figure 6:
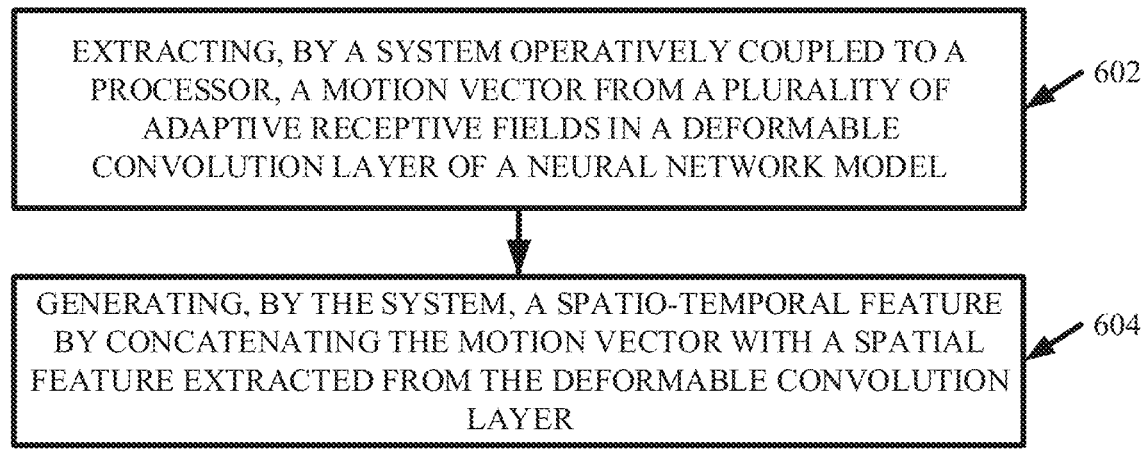
FIG. 6 illustrates a flow diagram of an example, non-limiting method that can facilitate action (e.g., fine-grained action) detection based on motion in one or more receptive fields of a neural network model in accordance with one or more embodiments described herein.

FIG. 6 illustrates a flow diagram of an example, non-limiting method 600 that can facilitate action detection (e.g., fine-grained action detection) based on motion in one or more receptive fields of a neural network model in accordance with one or more embodiments described herein. Repetitive description of like elements employed in other embodiments described herein is omitted for sake of brevity.

At 602, the method 600 can comprise extracting (e.g., via the motion component 112), by a system 100 operably coupled to a processor 120, one or more motion vectors from a plurality of adaptive receptive fields in one or more deformable convolution layers of a neural network model. For example, the one or more motion vectors can be extracted by computing a difference of the plurality of adaptive receptive fields through time.

At 604, the method 600 can comprise generating (e.g., via the action detection component 114), by the system 100, one or more spatio-temporal features by concatenating the one or more motion vectors with one or more spatial vectors extracted from the one or more deformable convolution layers. Additionally, the method 600 can comprise computing (e.g., via the loss component 115) motion loss and/or class loss to enforce correctness of predicted categories and/or consistency of the motion vectors. Additionally, in various embodiments the neural network model can be trained end-to-end.

Figure 7:
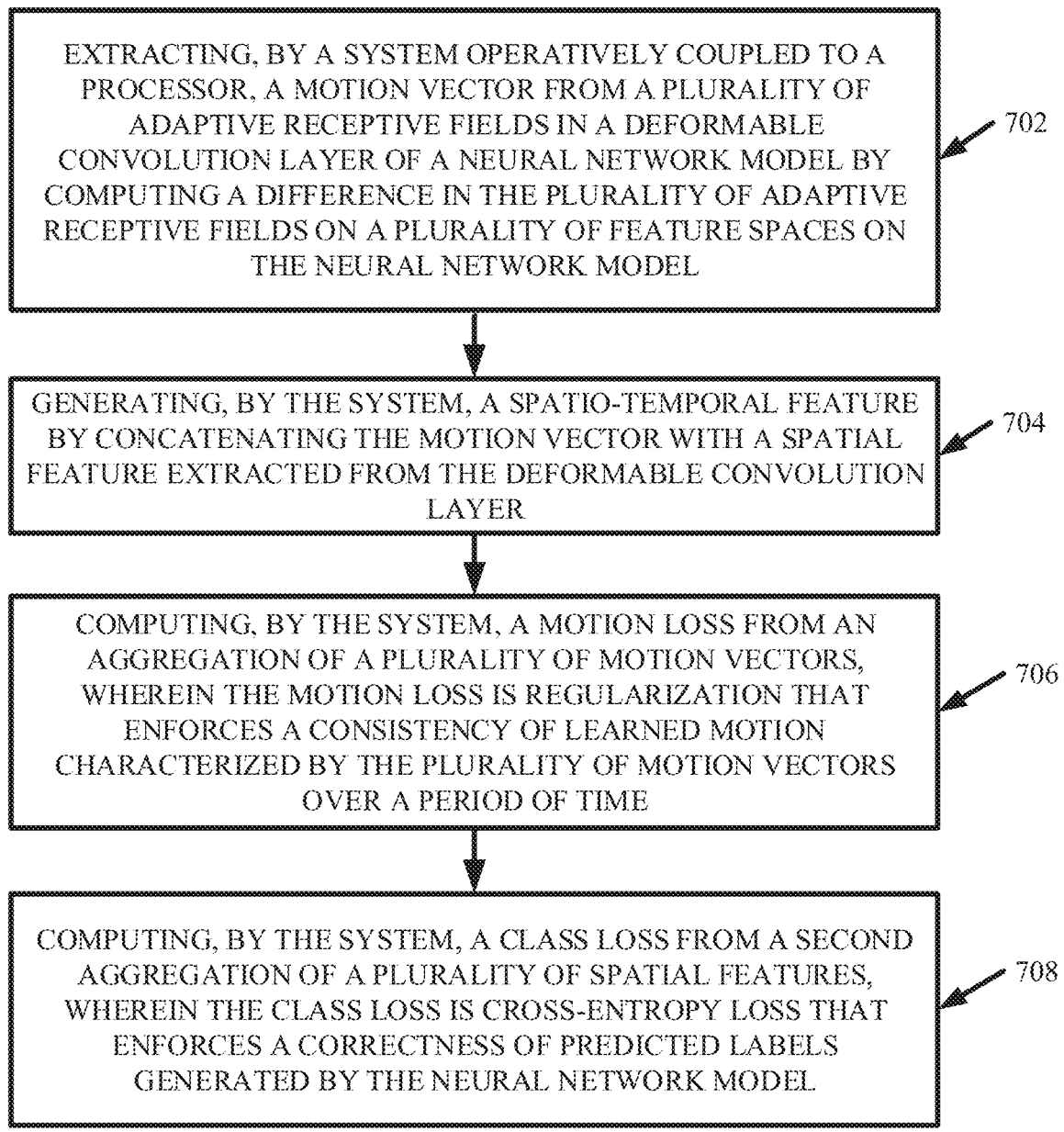
FIG. 7 illustrates a flow diagram of an example, non-limiting method that can facilitate action (e.g., fine-grained action) detection based on motion in one or more receptive fields of a neural network model in accordance with one or more embodiments described herein.

FIG. 7 illustrates a flow diagram of an example, non-limiting method 700 that can facilitate action detection (e.g., fine-grained action detection) based on motion in one or more receptive fields of a neural network model in accordance with one or more embodiments described herein. Repetitive description of like elements employed in other embodiments described herein is omitted for sake of brevity.

At 702, the method can comprise extracting (e.g., via the motion component 112), by a system 100 operatively coupled to a processor 120, one or more motion vectors from a plurality of adaptive receptive fields in one or more deformable convolution layers of one or more neural network models. The extracting at 702 can be facilitated by computing (e.g., via the motion component 112) a difference in the plurality of adaptive receptive fields on a plurality of feature spaces on the neural network model. For example, the one or more motion vectors can be extracted by computing a difference between a first adaptive receptive field from the plurality of adaptive receptive fields at a first time frame and a second adaptive receptive field from the plurality of adaptive fields at a second time frame.

At 704, the method 700 can comprise generating (e.g., via the action detection component 114), by the system 100, one or more spatio-temporal features by concatenating the one or more motion vectors with one or more spatial vectors extracted from the one or more deformable convolution layers.

At 706, the method 700 can comprise computing (e.g., via the loss component 115), by the system 100, a motion loss from an aggregation of a plurality of motion vectors, wherein the motion loss can be regularization that can enforce a consistency of learned motion characterized by the plurality of motion vectors over a period of time.

At 708, the method 700 can comprise computing (e.g., via the loss component 115), by the system 100, a class loss from an aggregation of a plurality of spatial features, wherein the class loss can be cross-entropy loss that can enforce a correctness of predicted labels (e.g., categorizations) generated by the neural network model.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
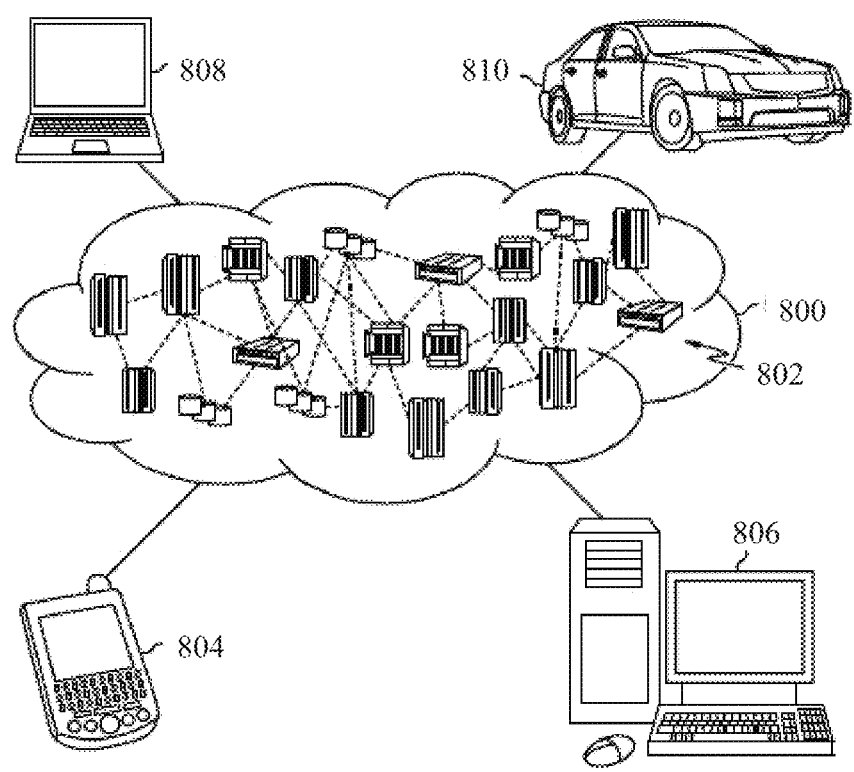
FIG. 8 depicts a cloud computing environment in accordance with one or more embodiments described herein.

Referring now to FIG. 8, illustrative cloud computing environment 800 is depicted. Repetitive description of like elements employed in other embodiments described herein is omitted for sake of brevity. As shown, cloud computing environment 800 includes one or more cloud computing nodes 802 with which local computing devices used by cloud consumers, such as, for example, personal digital assistant (PDA) or cellular telephone 804, desktop computer 806, laptop computer 808, and/or automobile computer system 810 may communicate. Nodes 802 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 804-810 shown in FIG. 8 are intended to be illustrative only and that computing nodes 802 and cloud computing environment 800 can communicate with any type of computerized device over any type of network and/or network addressable connection (e.g., using a web browser).

Figure 9:
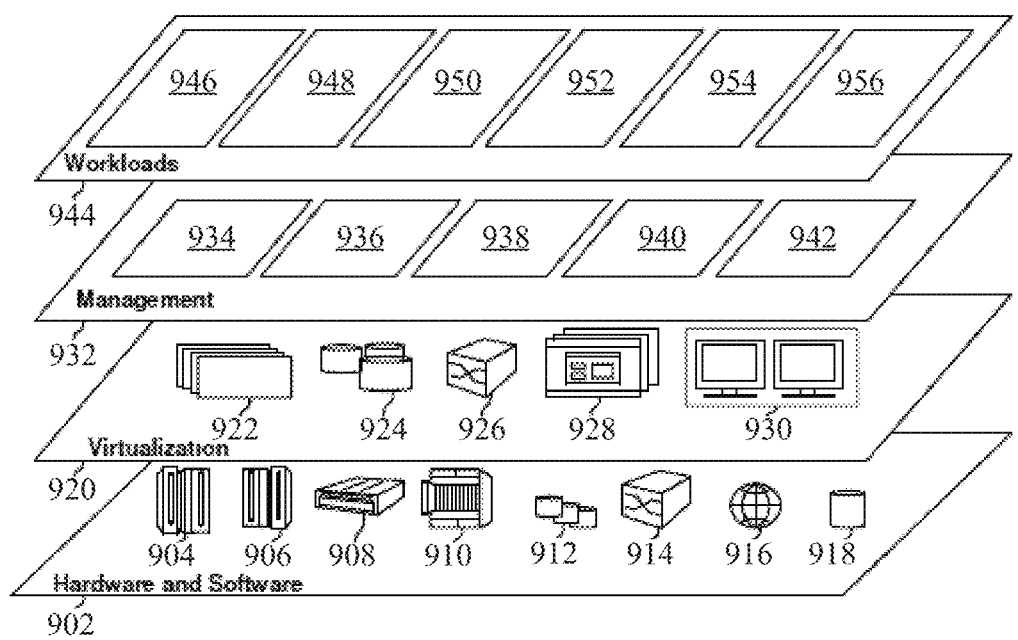
FIG. 9 depicts abstraction model layers in accordance with one or more embodiments described herein.

Referring now to FIG. 9, a set of functional abstraction layers provided by cloud computing environment 800 (FIG. 8) is shown. Repetitive description of like elements employed in other embodiments described herein is omitted for sake of brevity. It should be understood in advance that the components, layers, and functions shown in FIG. 9 are intended to be illustrative only and embodiments of the invention are not limited thereto. As depicted, the following layers and corresponding functions are provided.

Hardware and software layer 902 includes hardware and software components. Examples of hardware components include: mainframes 904; RISC (Reduced Instruction Set Computer) architecture based servers 906; servers 908; blade servers 910; storage devices 912; and networks and networking components 914. In some embodiments, software components include network application server software 916 and database software 918.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 932 may provide the functions described below. Resource provisioning 934 provides dynamic procurement of computing resources and other resources that are utilized to perform tasks within the cloud computing environment. Metering and Pricing 936 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 938 provides access to the cloud computing environment for consumers and system administrators. Service level management 940 provides cloud computing resource allocation and management such that required service levels are met. Service Level Agreement (SLA) planning and fulfillment 942 provide pre-arrangement for, and procurement of, cloud computing resources for which a future requirement is anticipated in accordance with an SLA.

Workloads layer 944 provides examples of functionality for which the cloud computing environment may be utilized. Examples of workloads and functions which may be provided from this layer include: mapping and navigation 946; software development and lifecycle management 948; virtual classroom education delivery 950; data analytics processing 952; transaction processing 954; and fine-grain action detection 956. Various embodiments of the present invention can utilize the cloud computing environment described with reference to FIGS. 8 and 9 to detect action (e.g., fine-grained action) based on motion in one or more receptive fields (e.g., adaptive receptive fields) of a neural network model (e.g., a CNN).

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 10:
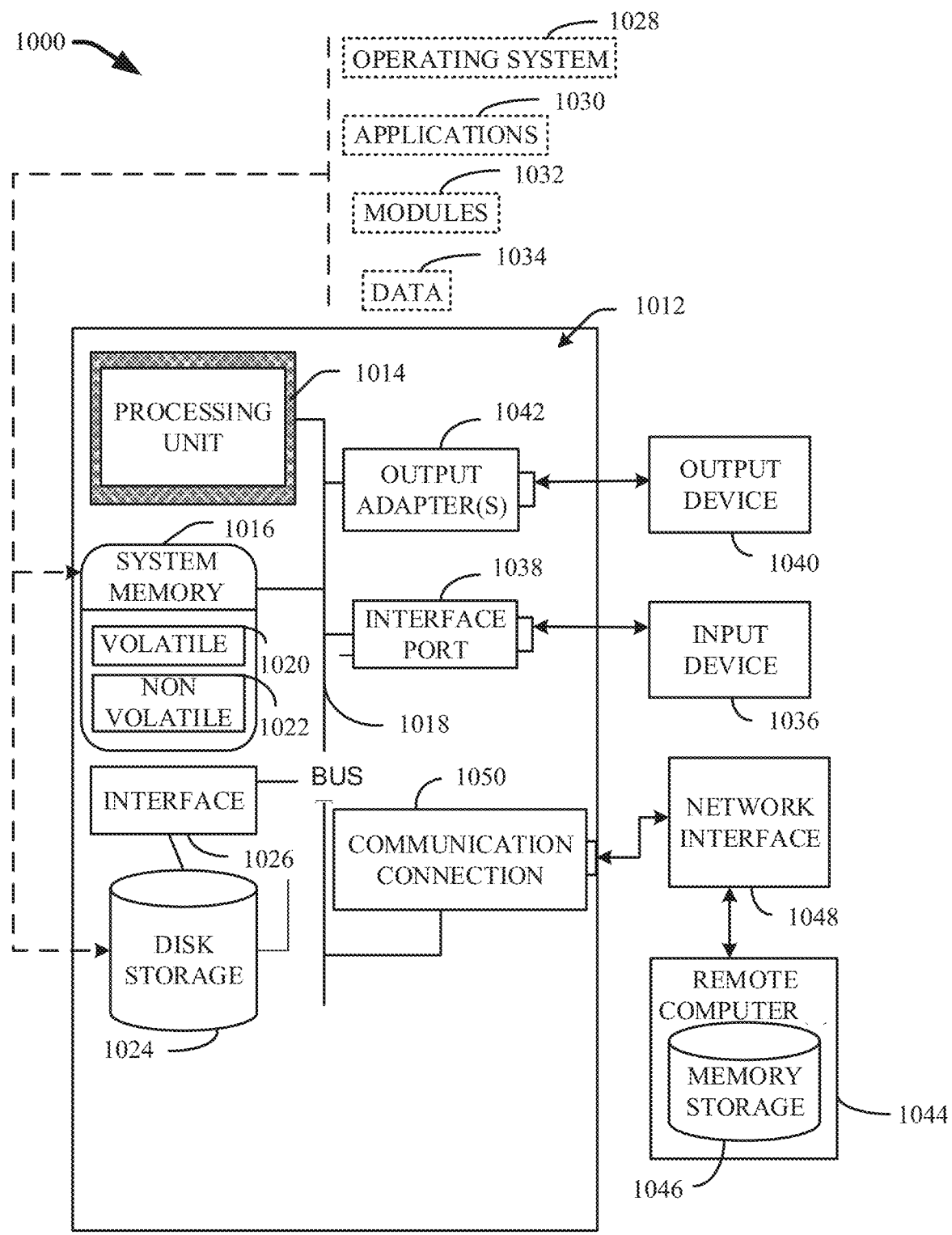
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a motion component that extracts, using a neural network model, a motion vector from a plurality of adaptive receptive fields in a deformable convolution layer of the neural network model, wherein the motion vector is extracted based on computing a difference between a first adaptive receptive field from the plurality of adaptive receptive fields at a first time frame and a second adaptive receptive field from the plurality of adaptive receptive fields at a second time frame; and an action detection component that generates, using the neural network model, a spatio-temporal feature by concatenating the motion vector with a spatial feature extracted from the deformable convolution layer, wherein the neural network model is a single stream model.

2. The system of claim 1, wherein the spatio-temporal feature is a vector that characterizes a fine-grained action associated with the spatial feature.

3. The system of claim 1, wherein the neural network model is trained end-to-end.

4. The system of claim 1, wherein the neural network model comprises a plurality of deformable convolution layers, wherein the deformable convolution layer is comprised within the plurality of deformable convolution layers, and wherein the motion vector is extracted from the plurality of deformable convolution layers.

5. The system of claim 1, further comprising a loss component that computes a motion loss from an aggregation of a plurality of motion vectors extracted by the motion component, wherein the motion loss is a regularization that enforces a consistency of learned motion characterized by the plurality of motion vectors over a period of time.

6. The system of claim 5, wherein the loss component further computes a class loss from a second aggregation of a plurality of spatial features extracted by the action detection component, wherein the class loss is cross-entropy loss that enforces a correctness of predicted labels generated by the neural network model.

7. The system of claim 1, wherein the motion component extracts the motion vector by computing the difference on a plurality of feature spaces of the neural network model.

8. The system of claim 1, wherein the action detection component generates the spatio-temporal feature in a cloud computing environment.

9. A computer-implemented method, comprising:
    extracting, by a system operatively coupled to a processor, using a neural network model, a motion vector from a plurality of adaptive receptive fields in a deformable convolution layer of the neural network model, wherein the extracting comprises computing a difference between a first adaptive receptive field from the plurality of adaptive receptive fields at a first time frame and a second adaptive receptive field from the plurality of adaptive receptive fields at a second time frame; and
    generating, by the system, using the neural network model, a spatio-temporal feature by concatenating the motion vector with a spatial feature extracted from the deformable convolution layer, wherein the neural network model is a single stream model.

10. The computer-implemented method of claim 9, wherein the spatio-temporal feature is a vector that characterizes a fine-grained action associated with the spatial feature.

11. The computer-implemented method of claim 9, further comprising computing, by the system, a motion loss from an aggregation of a plurality of motion vectors, wherein the motion loss is a regularization that enforces a consistency of learned motion characterized by the plurality of motion vectors over a period of time.

12. The computer-implemented method of claim 11, further comprising computing, by the system, a class loss from a second aggregation of a plurality of spatial features, wherein the class loss is cross-entropy loss that enforces a correctness of predicted labels generated by the neural network model.

13. The computer-implemented method of claim 9, wherein the neural network model is trained end-to-end.

14. A computer program product that facilitates detecting fine-grained action based on motion in receptive fields, the computer program product comprising a computer readable storage medium having program instructions embodied therewith, the program instructions executable by a processor to cause the processor to:
    extract, using a neural network model, a motion vector from a plurality of adaptive receptive fields in a deformable convolution layer of the neural network model based on computing a difference between a first adaptive receptive field from the plurality of adaptive receptive fields at a first time frame and a second adaptive receptive field from the plurality of adaptive receptive fields at a second time frame; and
    generate, using the neural network model, a spatio-temporal feature by concatenating the motion vector with a spatial feature extracted from the deformable convolution layer, wherein the neural network model is a single stream model.

15. The computer program product of claim 14, wherein the spatio-temporal feature is a vector that characterizes the fine-grained action associated with the spatial feature.

16. The computer program product of claim 14, wherein the program instructions further cause the processor to extract the motion vector by computing the difference on a plurality of feature spaces of the neural network model.

17. The computer program product of claim 14, wherein the neural network model is trained end-to-end.

18. The computer program product of claim 14, wherein the program instructions further cause the processor to compute a motion loss from an aggregation of a plurality of motion vectors, wherein the motion loss is a regularization that enforces a consistency of learned motion characterized by the plurality of motion vectors over a period of time.

19. The computer program product of claim 18, wherein the program instructions further cause the processor to compute a class loss from a second aggregation of a plurality of spatial features, and wherein the class loss is cross-entropy loss that enforces a correctness of predicted labels generated by the neural network model.

20. The computer program product of claim 14, wherein the spatio-temporal feature is generated in a cloud computing environment.

* * * * *